Ernst Meier
INVENTOR.

BY Ross & Mesbern

March 5, 1968    E. MEIER    3,371,753
HYDRAULIC QUICK-SLACK-TAKE-UP PULSATOR FOR DISK BRAKES
Filed Aug. 15, 1966    3 Sheets-Sheet 3

Ernst Meier
INVENTOR.

BY Ross & Masters

United States Patent Office 3,371,753
Patented Mar. 5, 1968

3,371,753
HYDRAULIC QUICK-SLACK-TAKE-UP PULSATOR
FOR DISK BRAKES
Ernst Meier, Frankfurt am Main-Sindlingen, Germany,
assignor to Alfred Teves, Frankfurt am Main, Germany,
a corporation of Germany
Filed Aug. 15, 1966, Ser. No. 601,501
Claims priority, application Germany, Aug. 14, 1965,
T 29,212
14 Claims. (Cl. 188—152)

My present invention relates to a hydraulic disk brake, particularly (but not exclusively) as used on automotive vehicles.

In a vehicular brake system with two or more wheel cylinders served by a common master cylinder, the brake pedal acting upon the fluid in the master cylinder must perform a stroke of considerable length until the pistons of the several wheel cylinders have advanced into a position in which the corresponding brake shoes make contact with the associated rotary brake elements (e.g. disks) carried on the wheel shaft. This is particularly true where, for the purpose of a favorable transmission ratio of hydraulic pressure, the working faces of the operating pistons in the wheel cylinders are large in comparison with the working face of the pedal-controlled driving piston in the master cylinder. Such large idle-stroke lengths not only delay the application of the braking force but also necessitate the presence of a considerable liquid volume in the master cylinder which, therefore, must be of sizable proportions.

The general object of my present invention is to provide an improved hydraulic brake system of the disk type wherein the aforestated drawbacks are avoided and the idle-stroke length of the brake pedal or other controller is minimized.

A more particular objective of my invention is to provide a brake system of this character in which the initial contact between brake shoe and brake disk is established almost at the beginning of the controller stroke, further operation of the controller resulting in a substantial intensification of the applied braking force without the use of auxiliary power, as in conventional brake-force intensifiers, and without resort to relatively complex constructions such as variable-volume master cylinders.

A further object of this invention is to provide means in such brake system for automatically compensating the progressive wear of the brake linings by a commensurate repositioning of the operating piston adjoining the brake shoe.

These objects, and others which will appear hereinafter, are realized in conformity with my present invention by the provision of a main piston and an auxiliary piston acting jointly upon an associated brake shoe, the two pistons being interconnected by unidirectionally effective coupling means in such a manner that the auxiliary piston may move forward independently of the main piston but that an operative displacement of the latter entrains the auxiliary piston and, with it, the brake shoe. The auxiliary piston is received in a fluid chamber formed by the brake-shoe support, e.g. a yoke spanning the disk periphery as is well known per se, while the main piston moves in a cylinder of its own. The working face of the main piston in its cylinder is substantially larger than the working face of the auxiliary piston in the aforementioned fluid chamber so that, if both fluid spaces are simultaneously subjected to hydraulic pressure from a common fluid source or separate sources, the smaller auxiliary piston will rapidly advance to urge the brake shoe under relatively low pressure against its confronting disk surface whereas the larger main piston will lag behind, being held back by a suitable biasing force until the brake shoes make contact.

After overcoming this biasing force, and with a delay due to an inherent lost motion of the unidirectional coupling means, the main piston will then supplement the braking force exerted by the auxiliary piston. The same lost motion, incidentally, will allow a limited reverse movement of the auxiliary piston with reference to the main piston, upon a subsequent release of the hydraulic pressure, so as to facilitate the disengagement of the brake shoe from the disk.

Advantageously, the force transmission from the main piston to the auxiliary piston takes place through the intermediary of a housing, shiftably mounted on the support, which defines the fluid chamber for the auxiliary piston and is connected therewith through the aforementioned unidirectional coupling means. In a preferred embodiment incorporating this construction, the auxiliary piston is generally mushroom-shaped so as to have a relatively wide head bearing in a stable manner upon the brake shoe and a relatively narrow stem received in the shiftable housing. A wedge member, positively connected with the housing or maintaining contact therewith through the intermediary of a restoring spring, may form part of the unidirectional coupling means by co-operating with a set of spherical rotary bodies which surround the stem of the auxiliary piston and are clamped between the latter and a frustoconical bore of the wedge member whenever the housing moves forwardly, beyond the permissible tolerance, with reference to the stem. This housing also constitutes a convenient anchorage for a manually operable control member designed to displace the auxiliary piston independently of or supplementary to the action of the hydraulic control member, e.g. in response to actuation of the usual emergency brake of the vehicle. In fact, the main piston need not bear directly upon the housing but may be coupled therewith by way of the same control member, the latter arrangement permitting a positioning of the main cylinder at a location remote from the auxiliary cylinder or fluid chamber so as to allow for a more effective cooling of this main cylinder.

The above and other features of my invention will become more fully apparent from the following detailed description of several embodiments, reference being made to the accompanying drawing in which.

Figure 1:
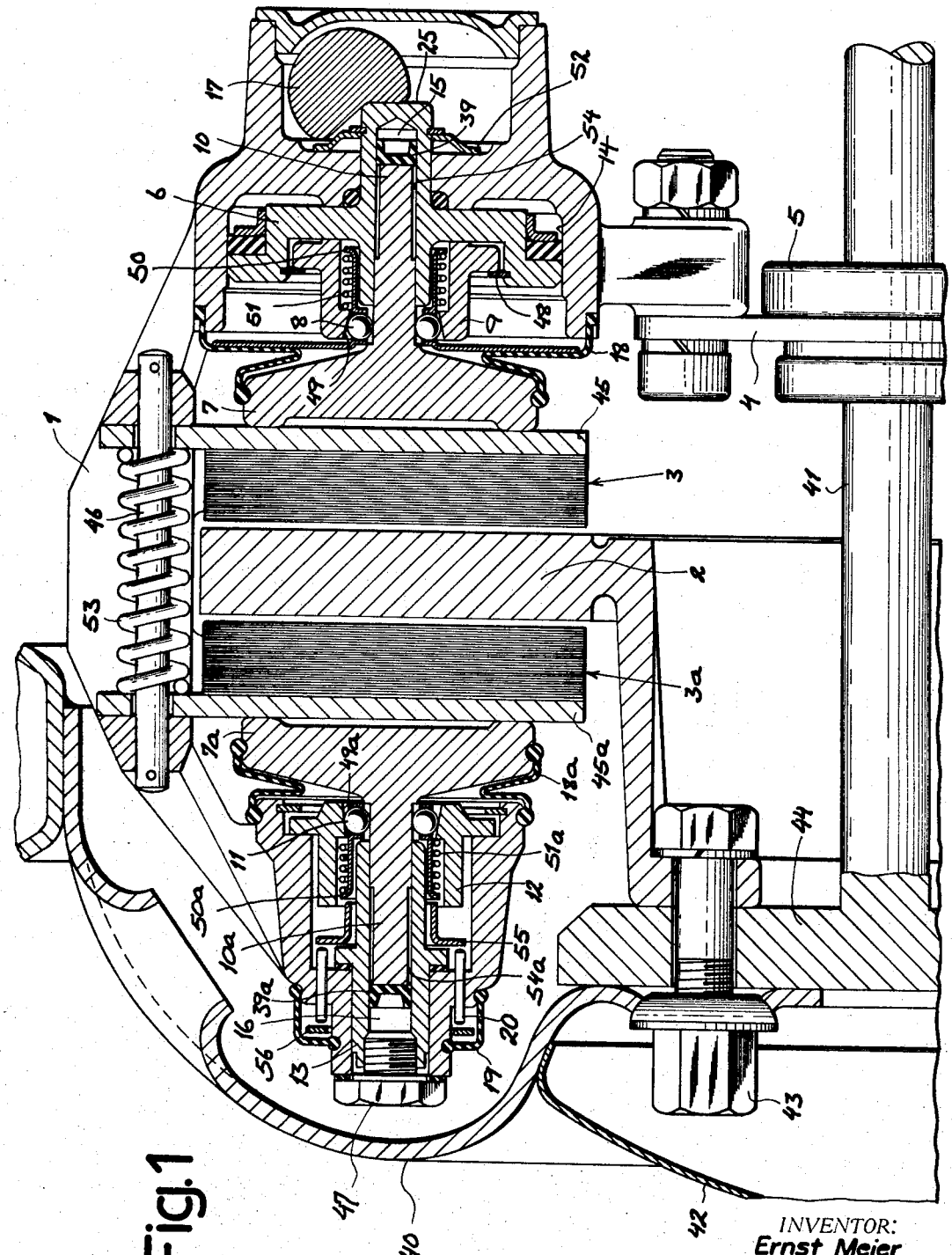
FIG. 1 illustrates, in axial section, a piston-and-cylinder assembly associated with a vehicular brake disk in a system according to my invention.

Reference will first be made to FIG. 1 which shows a vehicle wheel 40 with its shaft 41 journaled in a bearing 5, a conventional hub cap being indicated at 42.

A brake disk 2 is secured by mounting bolts 43 to the wheel hub 44, this disk having a resilient peripheral zone flanked by a pair of brake shoes 3, 3a displaceably carried on a yoke 1. The yoke, in turn, is mounted on the stationary bearing support 5 by means of a resilient link 4 adapted to flex in the axial direction of shaft 41. Brake shoes 3 and 3a include backing plates 45, 45a which carry the usual brake linings and are slidably suspended from mounting bolts 46 (only one shown).

Yoke 1 has a cylindrical recess 14 which accommodates a main piston 6 integral with a cylindrical housing 25, the latter in turn defining a fluid chamber 15 occupied by the stem 10 of a generally mushroom-shaped auxiliary piston having an enlarged head 7 in contact with backing plate 45 of brake shoe 3. A similar mushroom-shaped piston with head 7a and stem 10a bears upon the opposite backing plate 45a, the stem being guided in a fluid space 16 defined by a sleeve 13 which is rigidly held on yoke 1 by a screw 47. An annular wedge member 9 is positively connected with piston 6 by means of a locking ring 48 and has a frustoconical forward surface 49 surrounding a set of balls 8 rotatably mounted in a race 50. A coil spring 51 bears upon an internal shoulder of wedge member 9 and a flange of race 50 to urge the latter toward the rear, thus into a position in which the balls 8 contact the wedge 49. A flexible protective shroud 18 covers the race 50 and is anchored to the yoke 1 and the piston head 7.

The elements last described are substantially duplicated on the opposite side of disk 2 where the piston stem 10a is surrounded by a set of balls 11 in a race 50a within a wedge member 12 having a frustoconical surface 49a, the assembly being enclosed within a flexible shroud 18a. A coil spring 51a again urges the ball race toward the rear (i.e. away from disk 2) into a position of engagement of the balls with the associated wedge surface.

If the three fluid spaces 14, 15 and 16 are connected to a common master cylinder (not shown), the advance of a driving piston within that master cylinder under the control of a brake pedal will apply hydraulic pressure to the relatively wide face of main piston 6 and the relatively narrow faces (here constituted as interposed packing disks 39, 39a) of piston stems 10, 10a exposed to the fluid in spaces 14, 15 and 16, respectively. This hydraulic pressure will rapidly shift the piston heads 7, 7a toward each other so that brake shoes 3 and 3a are almost instantly brought into contact with respective surfaces of disk 2. At this initial stage the advance of main piston 6 is impeded by a resilient restoring force furnished by a spider 52 anchored to housing 25. When the hydraulic pressure exerted by the brake pedal is sufficient to overcome this restoring force, piston 6 advances and, through balls 8, further entrains piston head 7 so that an intensified pressure is now exercised by this piston upon brake shoe 3.

The large contact surfaces of piston heads 7 and 7a are formed with peripheral ribs along which they contact the backing plates 45, 45a of the brake shoes while their stems are positively guided in the respective housings 25 and 13; this insures a very stable mounting of the pistons.

A transverse shaft 17 is journaled in yoke 1 and bears with a generally radial shoulder upon the rear surface of housing 25 so that, if shaft 17 is rotated clockwise (as viewed in FIG. 1) under the control of a manual brake lever or the like, piston 7, 10 is advanced independently of the presence or absence of fluid pressure in cylinder spaces 14 and 15.

With the arrangement just described, disk 2 and link 4 remain virtually undeflected during the initial braking phase in which hydraulic pressure acts substantially symmetrically upon the stems 10, 10a of the auxiliary pistons. In the subsequent intensification stage, the pressure is unsymmetrically applied and gives rise to a reaction force which, if the disk 2 is not infinitely flexible or freely slidable in axial direction, acts upon the ring 4 to deflect it toward the right whereby the yoke 1 with its sleeve 13 likewise moves rightward as viewed in FIG. 1. The motion of sleeve 13 imparting a supplemental force to piston stem 10a which urges its head 7a under the same intensified pressure against brake shoe 3a. Upon release of the hydraulic pressure in cylinder 14, the resilient spider 52 restores the piston 6 to its illustrated starting position, thereby momentarily disengaging the wedge surfaces 49 and 49a from the balls 8 and 11 if a residual fluid pressure still exists in chambers 15 and 16. When this residual pressure ceases, the piston heads 7 and 7a are also free to recede from the disk 2 under a suitable restoring force, such as that provided by a light spring 53 between mounting plates 45 and 45a, if the axial sway of disk 2 does not suffice to reset them.

Upon progressive wear of the brake linings of shoes 3 and 3a, piston heads 7 and 7a will have to move ever further toward each other before contact is established between the disk and the brake shoes. The ball couplings 8, 49 and 11, 49a then prevent a complete return of these pistons to their illustrated starting position so that stems 10 and 10a progressively advance within their housings 25 and 13. It is desirable that this advance be halted when the linings of the brake shoes have undergone their maximum permissible wear, and for this purpose I prefer to provide the piston stems with formations which insure disengagement of the balls from their frustoconical wedge surfaces in a limiting piston position. In FIG. 1 I have shown these formations as reduced end portions 54, 54a of piston stems 10 and 10a; these formations could also be in the shape of a shoulder adapted to entrain the balls forwardly as more fully described hereinafter with reference to FIG. 2. With the arrangement illustrated in FIG. 1, the balls 8 and 11 drop into the peripheral clearances provided by the reduced extremities 54 and 54a when the stems 10 and 10a have reached the end of their stroke; further entrainment of the stems by the pressurization of piston 6 will then no longer be possible so that only the weaker braking force due to fluid pressure in chambers 15 and 16 can be generated, thereby minimizing further wear and apprising the driver of the necessity for replacing the brake linings.

Upon such replacement, which incidentally could be carried out independently for each brake shoe in the case of uneven wear, it is necessary to restore the pistons 7, 10 and 7a, 10a to their retracted starting positions. In order to prevent the balls 8 from interfering with a resetting of piston 7, 10, shroud 18 may be detached from yoke 1 whereupon a screw driver or the like may be inserted between wedge member 9 and race 50 to hold the balls out of contact with surface 49 against the force of spring 51. In the case of balls 11 there is no need for the removal of shroud 18a since a set of pusher rods 20, acting upon the race 50a through a collar 55, may be manually displaced by pressure upon a ring 56 through a deformable shroud 19.

Figure 2:
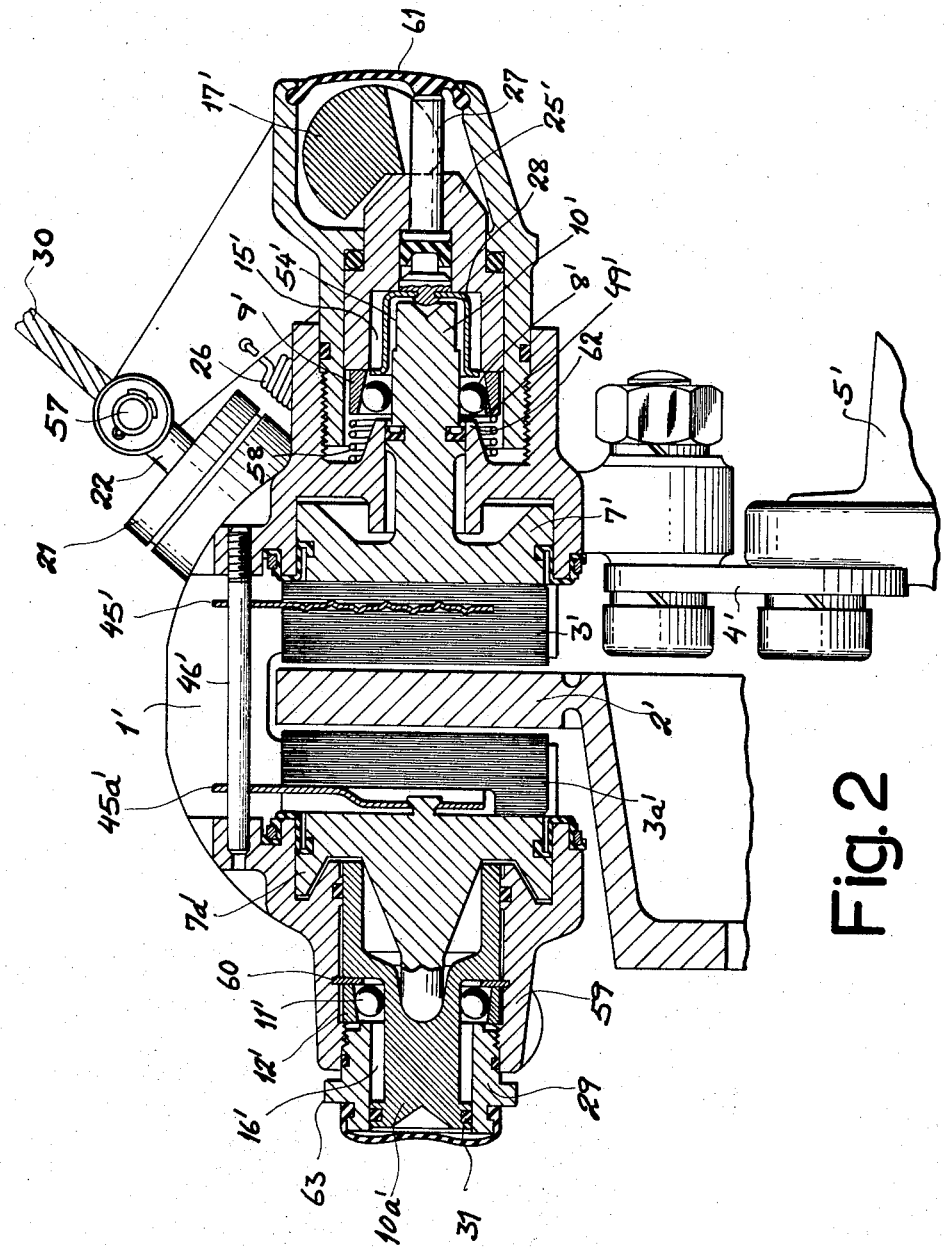
FIG. 2 is a view similar to FIG. 1, showing a modified assembly.

In the modified system of FIG. 2, elements corresponding to those of FIG. 1 have been designated by the same reference numerals with addition of a prime mark and, for the most part, need not be explained in detail.

The principal distinction between the two systems is that in FIG. 2 the cylinder housing 25' of the auxiliary piston 7', 10' is coupled to an associated main piston, here designated 22, through the intermediary of transverse shaft 17'. A main cylinder 21 is mounted, with limited swingability if necessary, on the yoke 1' at a location remote from the associated vehicle wheel (not shown in FIG. 2) so as to be exposed to the direct flow of ambient air. A cable 30, coming from the handle of the emergency brake, is attached to piston 22 which is articulated at 57 to a lever 23 rigid with shaft 17'. Piston 22 should have enough residual play inside its cylinder 21, upon a full depression of the associated brake pedal, to be free to move under the pull of cable 30 so as to permit the application of an adequate reserve force (e.g. of 30%) by the emergency brake. A restoring spring 26 tends to maintain the piston 22 retracted, this spring being anchored to the yoke 1' and to the lever 23 so as to resist manual displacement of that lever by operation of the emergency brake. Independently of spring 26, a restoring force is also applied to housing 25' by a coil spring 58 which bears directly upon the annular wedge member 49' and through it upon the housing 25'.

It should further be noted that the heads 7', 7a' of the auxiliary pistons in FIG. 2 are peripherally guided directly in yoke 1' and that also the stem 10' of the right-hand piston is so guided; the left-hand piston is made in two parts, the stem portion 10a′ being detachable from the head portion 7a′ and being received in a screw cap 29 which forms the fluid space 16′. Cap 29 is screwed into a tubular extension 59 of yoke 1′ which has an internal shoulder in contact with wedge member 12′, the latter being confined between that shoulder and a locking ring 60. Balls 11′ are limitedly movable in axial direction between the ring 60 and the inner surface of wedge member 12′.

As in the preceding embodiment, the piston stems 10′ and 10a′ are provided with formations which decouple the balls 8′, 11′ from the associated wedge surfaces in a limiting advanced position of the respective pistons. In the case of stem 10′ this decoupling formation is again shown as an extremity 54′ of reduced diameter whereas in the case of stem 10a′ it takes the form of a radial end flange 31 adapted to entrain the balls 11′ toward the ring 60. This positive protection of the brake linings against excessive wear allows a replacement of the relatively heavy backing plates shown in FIG. 1, which in conventional systems may have a thickness as high as 5 mm., by much thinner sheet-metal strips with a thickness of, say, 1 mm. of which two typical shapes are shown at 45′ and 45a′, respectively. If necessary, special restoring means may again be provided to withdraw the brake shoes 3′, 3a′ from disk 2′ as shown at 53 in FIG. 1.

The decoupling of stem 10′ from housing 25′ for a return of the right-hand auxiliary piston to its starting position may be effected in a simple manner by finger pressure, through a flexible shroud 61, upon a pin 27 to displace a thimble 28 in the fluid space 15′; an end flange of this thimble then drives the balls 8′ to the left until they strike an internal abutment 62 of yoke 1′. On the left-hand side, a similar result is obtained by rotating a milled flange 63 of cap 29 so that the forward end of this cap pushes the balls 11′ against ring 60.

Figure 3:
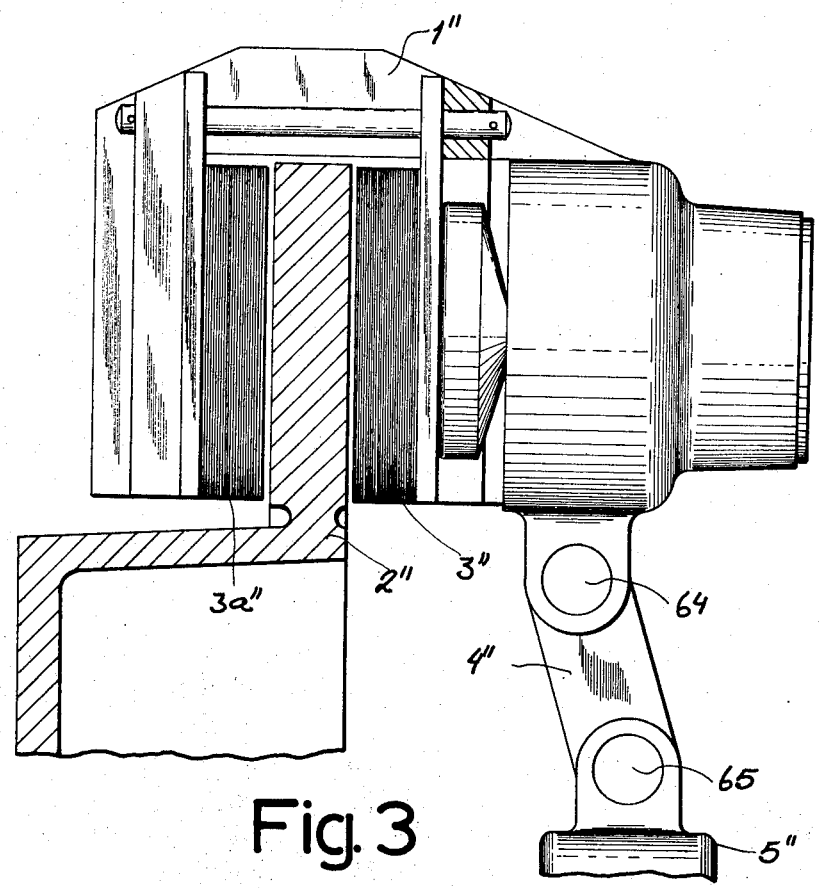
FIG. 3 is an elevational view illustrating still a further modification.

While only the auxiliary pistons have been shown symmetrically duplicated on opposite sides of the brake disk in the embodiments heretofore described, it will be apparent that it would also be possible to make the left-hand part of the system an exact image of the right-hand part, with its own main cylinder and piston, in which case the link 4 or 4′ need not be flexible or resilient. On the other hand, many of the advantages flowing from my present invention may also be realized in a system in which one of the brake shoes is directly mounted on the yoke, thus dispensing with the need for a second auxiliary piston. This has been illustrated in FIG. 3 where elements already described have been identified by the same numerals with the addition of a double-prime mark. The right-hand brake shoe 3″, i.e. the one more remote from the wheel to simplify heat dissipation from the hydraulic system, is again axially movable with reference to yoke 1″ by a two-piston mechanism of the type disclosed above, e.g. the one shown in FIG. 1. The other brake shoe 3a″ is fixedly mounted on the yoke 1″, with the result that the piston force exerted upon brake shoe 3″ will give rise to a reaction which must deform the disk 2″ and/or the link 4″ in order to establish contact between the disk and the brake shoe 3a″. If the link 4″ were resilient as before, the absence of any means for compensating the wear of brake shoe 3a″ would progressively widen the gap between that brake shoe and disk 2″ (in the unoperated position of the brake) compared with the gap between the disk and the brake shoe 3″. It is necessary, therefore, to make the link 4″ inelastically deformable, e.g. by the provision of a pair of friction joints 64, 65 whose frictional resistance can be overcome by a reaction force exceeding a predetermined threshold value.

Figure 4:
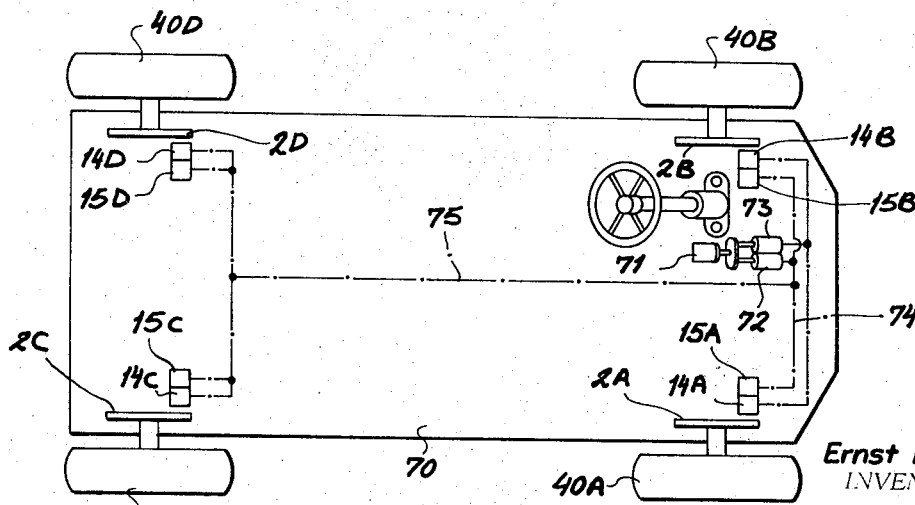
FIG. 4 is a diagrammatic view of a vehicular brake system incorporating my present improvement.

A particular advantage of the system according to the present invention is the possibility of hydraulically isolating the main piston 6 or 22 from the associated auxiliary piston 7, 10 or 7′, 10′ so that under certain circumstances, e.g. when the vehicle is operating at high speeds, fluid flow to the main cylinder 14 may be cut off by a governor-actuated valve or the like in order that only the auxiliary piston or pistons should remain effective until the vehicle has been sufficiently decelerated. The use of two separate hydraulic circuits for the main and auxiliary pistons also enables a reduction of the braking force on, say, the front wheels of a vehicle until the brakes take effect at the other (rear) wheels. This has been illustrated in FIG. 4 where an automotive vehicle 70 is shown to have a pair of front wheels 40A, 40B and rear wheels 40C, 40D equipped with respective brake disks 2A, 2B, 2C and 2D. The hydraulic brake systems associated with these disks, which may have the construction shown in any of FIGS. 1–3, have not been illustrated except for respective main cylinders 14A, 14B, 14C, 14D and auxiliary cylinders 15A, 15B, 15C, 15D. A brake pedal 71 controls a pair of master cylinders 72, 73 forming part of two hydraulic circuits 74 and 75, respectively. Circuit 74 connects master cylinder 72 with the auxiliary cylinders 15A, 15B of the front wheels whereas circuit 75 supplies hydraulic fluid from master cylinder 73 to all the other cylinders of the four wheels. Thus, a depression of pedal 71 subjects the front disks 2A, 2B to the relatively small braking force of their auxiliary pistons until and unless the hydraulic circuit 75 is effective to act with full force upon the rear disk 2C, 2D in which case also the main pistons served by cylinders 14A, 14B will be under pressure. Should the rear-brake system fail, only the auxiliary pistons of the front wheels would work for a relatively slow deceleration of the vehicle.

I claim:

1. In a hydraulic disk brake, in combination, a disk rotatable about its axis and coupled with a mass to be decelerated; support means adjacent said disk; a housing on said support means froming at least one fluid chamber; first and second brake shoes on said support bracketing a peripheral zone of said disk, at least said first brake shoe being movable with reference to said support means; a cylinder carried by said support means; a main piston with a relatively large working face in said cylinder; an auxiliary piston with a relatively small working face in said chamber and with a contact surface adjacent said first brake shoe for driving same into engagement with said disk; unidirectionally effective coupling means between said pistons; and fluid-source means connectable with said chamber and said cylinder for substantially concurrently applying a hydraulic liquid under pressure to both said working faces for operatively displacing said secondary piston toward said disk and said main piston in a direction transmitting an aiding hydraulic pressure to said secondary piston through said coupling means, said coupling means enabling limited relative reverse motion of said pistons for facilitating separation of said first brake shoe from said disk by a withdrawal of said contact surface upon release of fluid pressure in said cylinder and said chamber.

2. The combination defined in claim 1, further comprising resilient means resisting forward displacement of said main piston with reference to said support means.

3. The combination defined in claim 1 wherein said coupling means comprises a set of rotary bodies and wedges means engageable by said bodies upon said limited relative reverse motion.

4. The combination defined in claim 3, further comprising a release member displaceably carried on said housing for keeping said bodies out of engagement with said wedge means, thereby enabling restoration of said auxiliary piston to a starting position.

5. The combination defined in claim 1 wherein said support means includes a yoke straddling the periphery of said disk and wherein both said brake shoes are movable with reference to said yoke, said yoke forming a second fluid chamber opposite the first-mentioned fluid chamber and hydraulically connected therewith, further comprising a second auxiliary piston with a relatively small working face in said second chamber and with a contact surface confronting said disk opposite the first-mentioned contact surface adjacent said second brake shoe for driving same into engagement with said disk, and second unidirectional coupling means between said second auxiliary piston and said yoke enabling but limited withdrawal of said second auxiliary piston in a direction away from said disk.

6. The combination defined in claim 5 wherein said disk is carried on a shaft journaled in a bearing, said support means further including a resilient link connecting said yoke with said bearing.

7. The combination defined in claim 1 wherein said main piston is operatively connected with said housing, said coupling means being interposed between said housing and said auxiliary piston.

8. The combination defined in claim 7 wherein said auxiliary piston comprises a stem received in said chamber and forming said small working face, said stem being integral with an enlarged head defining said contact surface, said coupling means bearing upon said stem.

9. The combination defined in claim 8 wherein said main piston is integral with said housing and surrounds said stem.

10. The combination defined in claim 7, further comprising a manually operable control member positioned for engagement with said housing to displace said auxiliary piston toward said disk.

11. The combination defined in claim 10 wherein said main piston is coupled with said housing through the intermediary of said control member, 12. The combination defined in claim 11, further comprising a lever coupling said main piston with said control member and resilient restoring mean anchored to said lever for biasing said control member into an inoperative position.

13. The combination defined in claim 8 wherein said stem is provided at its end remote from said head with a surface formation disengaging said bodies from said wedge means in a limiting advanced position of said auxiliary piston, thereby decoupling said main piston from said auxiliary piston upon the latter reaching said advanced position after substantial wearing away of said first brake shoe.

14. The combination defined in claim 1 wherein said disk is mounted on the shaft of a front wheel of an automotive vehicle, said fluid-source means comprising a first hydraulic circuit connected with said chamber and a second hydraulic circuit connecting said cylinder in parallel with a brake cylinder of an associated rear wheel on said vehicle.

References Cited

UNITED STATES PATENTS 2,227,245  12/1940  Carroll _____ 188—152
2,747,694   5/1956  Helvern.
2,826,277   3/1958  Hawley.

MILTON BUCHLER, *Primary Examiner.*

G. E. HALVOSA, *Assistant Examiner.*